US011175090B2

(12) United States Patent
Buzzi et al.

(10) Patent No.: US 11,175,090 B2
(45) Date of Patent: Nov. 16, 2021

(54) PIGMENTED MONOLAYER LINER FOR APPLIANCES AND METHODS OF MAKING THE SAME

(71) Applicant: WHIRLPOOL CORPORATION, Benton Harbor, MI (US)

(72) Inventors: Ermanno Buzzi, Varese (IT); Charles R. Cravens, St. Joseph, MI (US); Vincent D. Csapos, Hamilton, MI (US); Muhammad Khizar, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 64 days.

(21) Appl. No.: 16/398,413

(22) Filed: Apr. 30, 2019

(65) Prior Publication Data

US 2019/0257574 A1  Aug. 22, 2019

Related U.S. Application Data

(62) Division of application No. 15/369,282, filed on Dec. 5, 2016, now Pat. No. 10,352,613.

(51) Int. Cl.
*B32B 27/08* (2006.01)
*F25D 23/06* (2006.01)
(Continued)

(52) U.S. Cl.
CPC ........ *F25D 23/066* (2013.01); *B29C 48/0021* (2019.02); *B29C 65/18* (2013.01);
(Continued)

(58) Field of Classification Search
CPC ................ B29C 48/0021; B29C 65/18; B29L 2031/7622; B32B 2250/03;
(Continued)

(56) References Cited

U.S. PATENT DOCUMENTS 1,849,369 A   3/1932 Frost
1,921,576 A   8/1933 Muffly
(Continued)

FOREIGN PATENT DOCUMENTS

CA          626838 A     9/1961
CN       201748744 U     2/2011
(Continued)

OTHER PUBLICATIONS

Hefei, CN-103407228, Nov. 27, (Year: 2013).*
(Continued)

*Primary Examiner* — Lawrence D Ferguson
(74) *Attorney, Agent, or Firm* — Price Heneveld LLP

(57) ABSTRACT

A method of making a liner for an appliance is provided that includes: mixing a polymeric capping layer precursor and a pigment additive; forming the capping layer precursor and the pigment additive into a capping layer at a capping layer formation temperature; and rolling the capping layer, a barrier layer and a polymeric base layer together to form a liner, each of the capping layer, the barrier layer and the base layer at about the capping layer formation temperature. Further, the liner comprises a capping region, a barrier region and a base region, the capping region comprising the pigment additive.

18 Claims, 3 Drawing Sheets

(51) Int. Cl.
  *B32B 27/32* (2006.01)
  *B32B 27/30* (2006.01)
  *B32B 27/20* (2006.01)
  *B29C 48/00* (2019.01)
  *B29C 65/18* (2006.01)
  *B32B 5/22* (2006.01)
  *B32B 5/18* (2006.01)
  *B32B 27/06* (2006.01)
  *B29L 31/00* (2006.01)

(52) U.S. Cl.
  CPC ............ *B32B 5/18* (2013.01); *B32B 5/22* (2013.01); *B32B 27/065* (2013.01); *B32B 27/08* (2013.01); *B32B 27/20* (2013.01); *B32B 27/302* (2013.01); *B32B 27/32* (2013.01); *B29L 2031/7622* (2013.01); *B32B 2250/246* (2013.01); *B32B 2264/102* (2013.01); *B32B 2264/108* (2013.01); *B32B 2270/00* (2013.01); *B32B 2307/558* (2013.01); *B32B 2307/7242* (2013.01); *B32B 2307/7265* (2013.01); *B32B 2509/10* (2013.01); *F25D 2400/18* (2013.01)

(58) Field of Classification Search
  CPC ......... B32B 2250/04; B32B 2250/246; B32B 2264/102; B32B 2264/108; B32B 2270/00; B32B 2307/4026; B32B 2307/558; B32B 2307/7242; B32B 2307/7265; B32B 2307/732; B32B 2509/10; B32B 27/065; B32B 27/08; B32B 27/20; B32B 27/302; B32B 27/32; B32B 5/18; B32B 5/22; B32B 7/08; B32B 7/12; F25D 23/066; F25D 2400/18
  See application file for complete search history.

(56) References Cited

U.S. PATENT DOCUMENTS

| | | |
|---|---|---|
| 2,191,659 A | 2/1940 | Hintze |
| 2,432,042 A | 12/1947 | Richard |
| 2,451,884 A | 10/1948 | Stelzer |
| 2,729,863 A | 1/1956 | Kurtz |
| 3,066,063 A | 11/1962 | Ecklund et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,408,316 A | 10/1968 | Mueller et al. |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,670,521 A | 6/1972 | Dodge, III et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 3,960,631 A | 6/1976 | Weiss et al. |
| 4,005,919 A | 2/1977 | Hoge et al. |
| 4,170,391 A | 10/1979 | Bottger |
| 4,196,950 A | 4/1980 | Churchill et al. |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,330,310 A | 5/1982 | Tate, Jr. et al. |
| 4,396,362 A | 8/1983 | Thompson et al. |
| 4,529,368 A | 7/1985 | Makansi |
| 4,583,796 A | 4/1986 | Nakajima et al. |
| 4,681,788 A | 7/1987 | Barito et al. |
| 4,781,968 A | 11/1988 | Kellerman |
| 4,865,875 A | 9/1989 | Kellerman |
| 4,870,735 A | 10/1989 | Jahr et al. |
| 4,914,341 A | 4/1990 | Weaver et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,168,674 A | 12/1992 | Molthen |
| 5,171,346 A | 12/1992 | Hallett |
| 5,227,245 A | 7/1993 | Brands et al. |
| 5,251,455 A | 10/1993 | Cur et al. |
| 5,269,601 A | 12/1993 | Williams et al. |
| 5,340,208 A | 8/1994 | Hauck et al. |
| 5,375,428 A | 12/1994 | LeClear et al. |
| 5,500,287 A | 3/1996 | Henderson |
| 5,500,305 A | 3/1996 | Bridges et al. |
| 5,505,810 A | 4/1996 | Kirby et al. |
| 5,509,248 A | 4/1996 | Dellby et al. |
| 5,532,034 A | 7/1996 | Kirby et al. |
| 5,532,315 A | 7/1996 | Bonekamp et al. |
| 5,533,311 A | 7/1996 | Tirrell et al. |
| 5,599,081 A | 2/1997 | Revlett et al. |
| 5,600,966 A | 2/1997 | Valence et al. |
| 5,768,837 A | 6/1998 | Sjoholm |
| 5,792,801 A | 8/1998 | Tsuda et al. |
| 5,826,780 A | 10/1998 | Nesser et al. |
| 5,834,126 A | 11/1998 | Sheu |
| 5,866,247 A | 2/1999 | Klatt et al. |
| 5,918,478 A | 7/1999 | Bostic et al. |
| 5,950,395 A | 9/1999 | Takemasa et al. |
| 5,952,404 A | 9/1999 | Simpson et al. |
| 6,013,700 A | 1/2000 | Asano et al. |
| 6,063,471 A | 5/2000 | Dietrich et al. |
| 6,163,976 A | 12/2000 | Tada et al. |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,244,458 B1 | 6/2001 | Frysinger et al. |
| 6,266,970 B1 | 7/2001 | Nam et al. |
| 6,294,595 B1 | 9/2001 | Tyagi et al. |
| 6,485,122 B2 | 1/2002 | Wolf et al. |
| 6,428,130 B1 | 8/2002 | Banicevic et al. |
| 6,430,780 B1 | 8/2002 | Kim et al. |
| 6,519,919 B1 | 2/2003 | Takenouchi et al. |
| 6,589,646 B1 | 7/2003 | Morgenstern |
| 6,629,429 B1 | 10/2003 | Kawamura et al. |
| 6,655,766 B2 | 12/2003 | Hodges |
| 6,689,840 B1 | 2/2004 | Eustace et al. |
| 6,736,472 B2 | 5/2004 | Banicevic |
| 6,860,082 B1 | 3/2005 | Yamamoto et al. |
| 7,008,032 B2 | 3/2006 | Chekal et al. |
| 7,197,792 B2 | 4/2007 | Moon |
| 7,197,888 B2 | 4/2007 | LeClear et al. |
| 7,207,181 B2 | 4/2007 | Murray et al. |
| 7,234,247 B2 | 6/2007 | Maguire |
| 7,263,744 B2 | 9/2007 | Kim et al. |
| 7,360,371 B2 | 4/2008 | Feinauer et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,794,805 B2 | 9/2010 | Aumaugher et al. |
| 7,845,745 B2 | 12/2010 | Gorz et al. |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,108,972 B2 | 2/2012 | Bae et al. |
| 8,157,338 B2 | 4/2012 | Seo et al. |
| 8,162,415 B2 | 4/2012 | Hagele et al. |
| 8,182,051 B2 | 5/2012 | Laible et al. |
| 8,197,019 B2 | 6/2012 | Kim |

(56) References Cited

U.S. PATENT DOCUMENTS

| | | |
|---|---|---|
| 8,266,923 B2 | 9/2012 | Bauer et al. |
| 8,382,219 B2 | 2/2013 | Hottmann et al. |
| 8,434,317 B2 | 5/2013 | Besore |
| 8,439,460 B2 | 5/2013 | Laible et al. |
| 8,491,070 B2 | 7/2013 | Davis et al. |
| 8,516,845 B2 | 8/2013 | Wuesthoff et al. |
| 8,590,992 B2 | 11/2013 | Lim et al. |
| 8,717,029 B2 | 5/2014 | Chae et al. |
| 8,752,921 B2 | 6/2014 | Gorz et al. |
| 8,763,847 B2 | 7/2014 | Mortarotti |
| 8,764,133 B2 | 7/2014 | Park et al. |
| 8,776,390 B2 | 7/2014 | Hanaoka et al. |
| 8,840,204 B2 | 9/2014 | Bauer et al. |
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 9,009,969 B2 | 4/2015 | Choi et al. |
| RE45,501 E | 5/2015 | Maguire |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 10,907,888 B2 | 2/2021 | Csapos et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0226141 A1 | 11/2004 | Yates et al. |
| 2005/0042247 A1 | 2/2005 | Gomoll et al. |
| 2005/0229614 A1 | 10/2005 | Ansted |
| 2006/0064846 A1 | 3/2006 | Espindola et al. |
| 2006/0094804 A1* | 5/2006 | Lachowicz ........ C08F 222/1006 524/129 |
| 2006/0261718 A1 | 11/2006 | Miseki et al. |
| 2006/0266075 A1 | 11/2006 | Itsuki et al. |
| 2007/0264468 A1 | 11/2007 | Boyd et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2009/0032541 A1 | 2/2009 | Rogala et al. |
| 2009/0131571 A1 | 5/2009 | Fraser et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2010/0206464 A1 | 8/2010 | Heo et al. |
| 2010/0218543 A1 | 9/2010 | Duchame |
| 2010/0287843 A1 | 11/2010 | Oh |
| 2010/0287974 A1 | 11/2010 | Cur et al. |
| 2011/0011119 A1 | 1/2011 | Kuehl et al. |
| 2011/0023527 A1 | 2/2011 | Kwon et al. |
| 2011/0095669 A1 | 4/2011 | Moon et al. |
| 2011/0215694 A1 | 9/2011 | Fink et al. |
| 2011/0220662 A1 | 9/2011 | Kim et al. |
| 2011/0309732 A1 | 12/2011 | Horil et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0240612 A1 | 9/2012 | Wuesthoff et al. |
| 2012/0280608 A1 | 11/2012 | Park et al. |
| 2013/0026900 A1 | 1/2013 | Oh et al. |
| 2013/0043780 A1 | 2/2013 | Ootsuka et al. |
| 2013/0221819 A1 | 8/2013 | Wing |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0166926 A1 | 6/2014 | Lee et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0346942 A1 | 11/2014 | Kim et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0059399 A1 | 3/2015 | Hwang et al. |
| 2015/0115790 A1 | 4/2015 | Ogg |
| 2015/0159936 A1 | 6/2015 | Oh et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0283795 A1 | 10/2015 | Kim et al. |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CN | 102153829 A | 8/2011 |
| CN | 102645071 A | 8/2012 |
| CN | 102717578 A | 10/2012 |
| CN | 202973713 U | 6/2013 |
| CN | 103407228 A | 11/2013 |
| CN | 104816478 A | 8/2015 |
| CN | 105115221 A | 12/2015 |

(56) References Cited

FOREIGN PATENT DOCUMENTS

| | | |
|---|---|---|
| CN | 204963379 U | 1/2016 |
| DE | 4110292 A1 | 10/1992 |
| DE | 4409091 A1 | 9/1995 |
| DE | 19914105 A1 | 9/2000 |
| DE | 102011051178 A1 | 12/2012 |
| EP | 0645576 A1 | 3/1995 |
| EP | 1602425 A1 | 12/2005 |
| EP | 1624263 A2 | 2/2006 |
| EP | 2543942 A2 | 1/2013 |
| EP | 2878427 A1 | 6/2015 |
| FR | 2991698 A1 | 12/2013 |
| JP | 04165197 A | 6/1992 |
| JP | 04309778 A | 11/1992 |
| JP | 11159693 A | 6/1999 |
| JP | 2000320958 A | 11/2000 |
| JP | 2002068853 A | 3/2002 |
| JP | 3438948 B2 | 8/2003 |
| JP | 2005069596 A | 3/2005 |
| JP | 2005098637 A | 4/2005 |
| JP | 2006161834 A | 6/2006 |
| JP | 2006200685 A | 8/2006 |
| JP | 2008190815 A | 8/2008 |
| JP | 2013050267 A | 3/2013 |
| JP | 2013076471 A | 4/2013 |
| KR | 20050095357 A | 9/2005 |
| KR | 100620025 B1 | 9/2006 |
| KR | 1020070065743 A | 6/2007 |
| KR | 20090026045 A | 3/2009 |
| KR | 20150089495 A | 8/2015 |
| RU | 2061925 C1 | 6/1996 |
| RU | 2077411 C1 | 4/1997 |
| RU | 2081858 C1 | 6/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 C2 | 5/2005 |
| RU | 2253792 C2 | 6/2005 |
| RU | 2349618 C2 | 3/2009 |
| RU | 2414288 C2 | 3/2011 |
| RU | 2422598 C2 | 6/2011 |
| RU | 142892 U1 | 7/2014 |
| RU | 2529525 C1 | 9/2014 |
| RU | 2571031 C2 | 12/2015 |
| SU | 203707 A1 | 12/1967 |
| SU | 476407 A1 | 7/1975 |
| SU | 547614 A1 | 5/1977 |
| SU | 648780 A1 | 2/1979 |
| SU | 1307186 A1 | 4/1987 |
| WO | 9614207 A1 | 5/1996 |
| WO | 9721767 A1 | 6/1997 |
| WO | 9920961 A1 | 4/1999 |
| WO | 9920964 A1 | 4/1999 |
| WO | 2001060598 A2 | 8/2001 |
| WO | 0202987 A1 | 1/2002 |
| WO | 2002052208 A1 | 7/2002 |
| WO | 02060576 A1 | 8/2002 |
| WO | 03072684 A1 | 9/2003 |
| WO | 2004010042 A1 | 1/2004 |
| WO | 2006045694 A1 | 5/2006 |
| WO | 2006073540 A2 | 7/2006 |
| WO | 2007033836 A1 | 3/2007 |
| WO | 2007106067 A2 | 9/2007 |
| WO | 2008065453 A1 | 6/2008 |
| WO | 2008077741 A2 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2010007783 A1 | 1/2010 |
| WO | 2010127947 A2 | 11/2010 |
| WO | 2011058678 A1 | 5/2011 |
| WO | 2012152646 A1 | 11/2012 |
| WO | 2013116103 A1 | 8/2013 |
| WO | 2013116302 A1 | 8/2013 |
| WO | 2014038150 A1 | 3/2014 |
| WO | 2014121893 A1 | 8/2014 |
| WO | 2014184393 A1 | 11/2014 |
| WO | 2013140816 A1 | 9/2015 |
| WO | 2016082907 A1 | 6/2016 |
| WO | 2017029782 A1 | 2/2017 |

OTHER PUBLICATIONS

Cai et al., "Generation of Metal Nanoparticles by Laser Ablation of Microspheres," J. Aerosol Sci., vol. 29, No. 5/6 (1998), pp. 627-636.
Raszewski et al., "Methods for Producing Hollow Glass Microspheres," Powerpoint, cached from Google, Jul. 2009, 6 pages.

* cited by examiner

PIGMENTED MONOLAYER LINER FOR APPLIANCES AND METHODS OF MAKING THE SAME

CROSS-REFERENCE TO RELATED APPLICATION

This application is a divisional of and claims priority to U.S. patent application Ser. No. 15/369,282, filed on Dec. 5, 2016, now U.S. Pat. No. 10,352,613, issued Jul. 16, 2019, entitled "PIGMENTED MONOLAYER LINER FOR APPLIANCES AND METHODS OF MAKING THE SAME," the contents of which are relied upon and incorporated herein by reference in their entirety.

TECHNICAL FIELD

The disclosure generally relates to liners for appliances, particularly pigmented liners for refrigeration applications, and methods for making them.

BACKGROUND OF THE INVENTION

Liners having particular colors, hues, tints and the like are desired for many appliance-related applications, such as refrigeration appliances. As appliance designers have recently placed more emphasis on interior design and lighting (e.g., given the lower energy usage of light-emitting diode (LED) sources), the importance of interior aesthetics has increased for many consumers. Similarly, appliance manufacturers often emphasize aesthetics, including through interior design approaches, in attempting to obtain brand differentiation from their competitors.

Liners employed in appliances, including refrigeration appliances, are often produced with extrusion processes. As these liners often are fabricated from two or more layers, conventional approaches to adding color to these liners often involve adding pigments to each extruder employed in making a layer employed in the liner. As pigments are added to multiple extruders, the complexity, repeatability and manufacturing cost of matching colors increases significantly for a liner that comprises two or more layers having pigments. Further, as significant loadings of pigments in these multi-layer liners are often employed, down-stream processes, e.g., thermo-forming, to incorporate the liners into an end product can lead to local discoloration and yield losses. Further, multiple and cost-intensive extrusion runs are often required to fabricate a liner having multiple, extruded layers with pigments that matches a particular desired color, tint or hue. Still further, these approaches for making a liner having multiple, extruded pigmented layers require one or more adhesives to bond the layers, which increases cost and can decrease manufacturing yield.

Accordingly, there is a need for methods of making liners, particularly pigmented liners for refrigeration appliances, which are repeatable, with high manufacturing flexibility, and low in cost. There is also a need for pigmented liners that do not require or otherwise employ internal adhesives, have a high reliability and can be configured according to various design aesthetics.

BRIEF SUMMARY OF THE INVENTION

According to one aspect of the disclosure, a method of making a liner for an appliance is provided that includes: mixing a polymeric capping layer precursor and a pigment additive; forming the capping layer precursor and the pigment additive into a capping layer at a capping layer formation temperature; and rolling the capping layer into a polymeric base layer to form a liner, each of the capping layer and the base layer at about the capping layer formation temperature. Further, the liner comprises a capping region and a base region, the capping region comprising the pigment additive.

According to another aspect of the disclosure, a method of making a liner for an appliance is provided that includes: mixing a polymeric capping layer precursor and a pigment additive; forming the capping layer precursor and the pigment additive into a capping layer at a capping layer formation temperature; and rolling the capping layer, a barrier layer and a polymeric base layer together to form a liner, each of the capping layer, the barrier layer and the base layer at about the capping layer formation temperature. Further, the liner comprises a capping region, a barrier region and a base region, the capping region comprising the pigment additive.

According to a further aspect, a liner for an appliance is provided that includes: a polymeric liner comprising a monolayer, the monolayer comprising: a base region comprising a high-impact polystyrene material; and a capping region comprising a high-impact polystyrene material and a pigment additive, the capping region disposed over the base region. Further, the base region and the capping region are joined with substantially no interfaces between them.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention there are shown in the drawings certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

DETAILED DESCRIPTION

Figure 1:
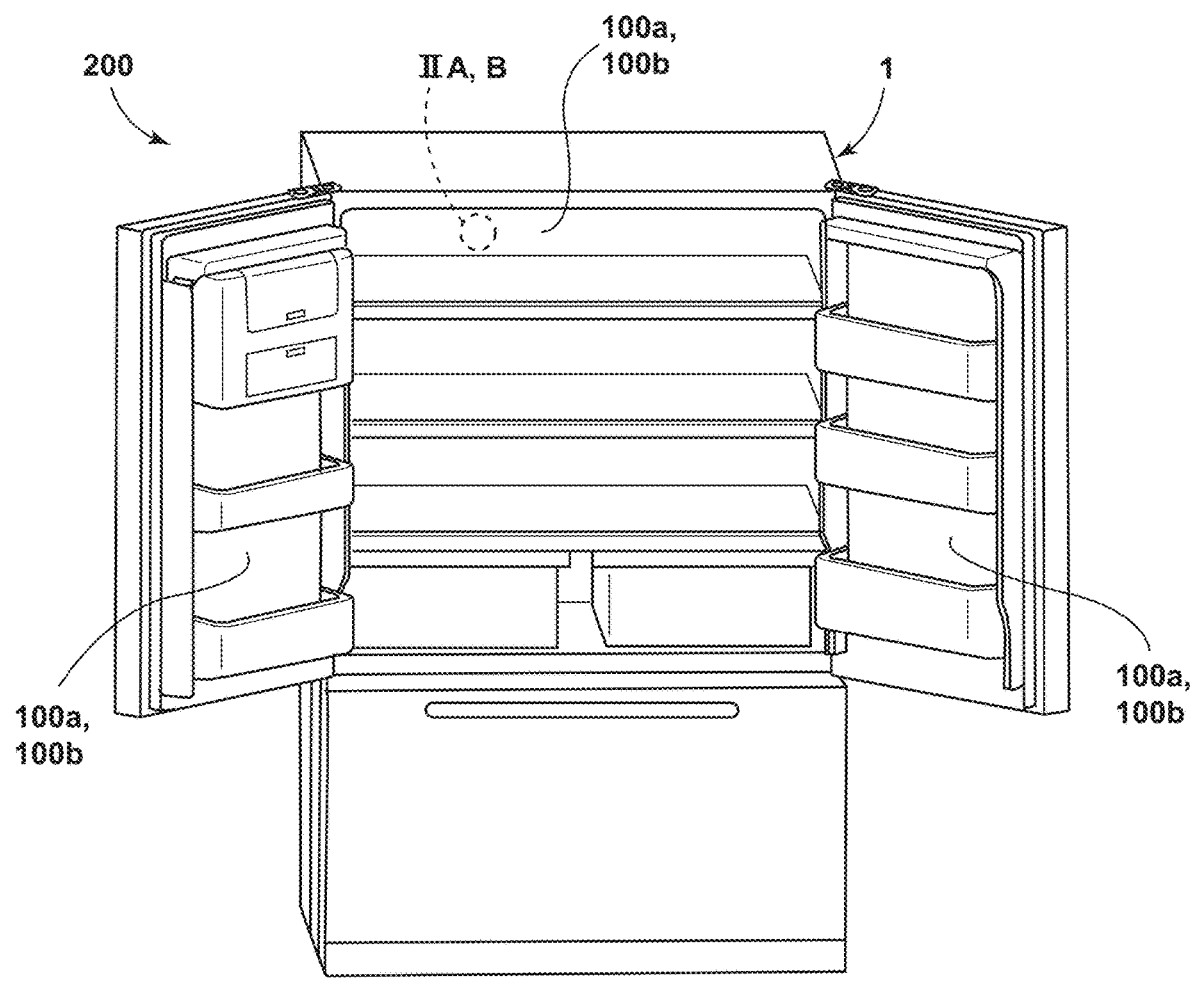
FIG. 1 is a schematic of a refrigeration appliance comprising a liner according to an aspect of the disclosure.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include the plural reference unless the context clearly dictates otherwise.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

As outlined in various exemplary forms, methods of making liners are outlined in the disclosure that are repeatable, with high manufacturing flexibility, and low in cost. These methods can be employed to fabricate pigmented liners suitable for various appliances, including refrigeration appliances. Also outlined in the disclosure are configurations for liners, e.g., the pigmented liners made from these methods, which do not require or otherwise employ internal adhesives, have a high reliability and can be configured according to various design aesthetics.

Referring now to FIG. 1, a refrigeration appliance 200 is provided in exemplary form that comprises a liner 100a, 100b according to an embodiment. As shown, the liner 100a, 100b is mounted to a cabinet 1 of the refrigeration appliance 200. In some configurations, the liner 100a, 100b is mounted to a foam 70 (see FIGS. 2A and 2B) installed on an exterior surface of the cabinet 1. In other configurations, the liner 100a, 100b is mounted directly to the cabinet 1. Typically, the liner 100a, 100b is attached, joined or otherwise fastened to the cabinet 1 through an adhesive, bonding agent, mechanical fastener (e.g., rivets, screws, etc.) or another comparable approach. However, as noted earlier, the liner 100a, 100b itself does not include any internal adhesives and, according to some aspects, includes one or more pigment additives.

Figure 2A:
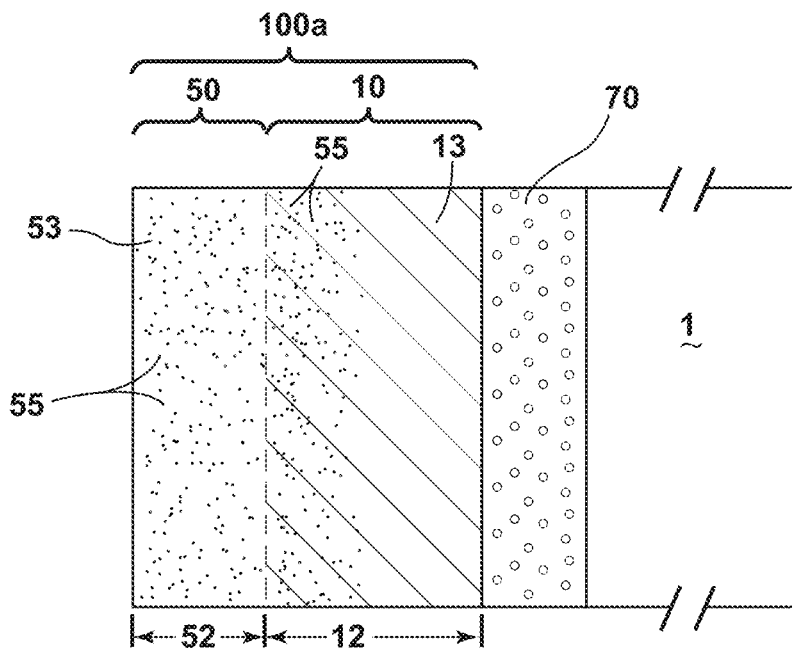
FIG. 2A is a schematic of an enlarged cross-section of a liner at region IIA comprising a capping region with a pigment additive and a base region according to an aspect of the disclosure.

As shown in FIG. 2A, a liner 100a (such as incorporated into the appliance 200 depicted in FIG. 1) includes a capping region 50 and a base region 10. According to an implementation, the capping region 50 and the base region 10 are joined with substantially no interfaces between them, thus forming a monolayer that serves as the liner 100a. More particularly, the liner 100a (or the monolayer of the liner) can include a base region 10 that is formed from a base 13 that comprises a high-impact polystyrene (HIPS) precursor material. The liner 100a also includes a capping region 50, disposed over the base region 10, which is formed from a capping base 53 that comprises the same or a similar HIPS precursor material as employed in the capping region 50. The capping region 50 also includes a pigment additive 55 within the capping base 53. In general, the pigment additive 55 is incorporated and/or dispersed within the capping base 53 at a level sufficient to impart a desired color, hue, tinting or the like in the liner 100a.

Referring again to the liner 100a depicted in FIG. 2A, the base 13 of the base region 10 can be formed from one or more precursor materials including high-impact polystyrene (HIPS), polybutadiene, polystyrene (PS), and acrylonitrile butadiene styrene (ABS) materials. In some aspects, fungicides and/or colorant dispersants can be incorporated into the base 13 of the base region 10. In preferred embodiments, the precursor material(s) selected for use in the base 13 are thermoplastics, suitable for use in an extrusion process and the incorporation of one or more additives, such as pigments and other colorants. As also depicted in FIG. 2A, the base 13 of the base region 10 can be configured with a thickness 12 (e.g., through extrusion, rolling, etc.) of about 1.3 mm (about 50 mils) to about 13 mm (about 500 mils). In a preferred embodiment, the base 13 has a thickness 12 of about 3.8 mm (about 150 mils) to about 7.6 mm (about 300 mils). Note that the thickness 12 of the base 13 of the base region 10 is given in approximate dimensions, as would be typically associated with the base 13 being in a sheet or layer form before incorporation into the liner 100a. For example, the base region 10 and the capping region 50, as part of the liner 100a, do not contain any appreciable interfaces between them according to some implementations of the disclosure.

Referring again to the liner 100a depicted in FIG. 2A, the capping base 53 of the capping region 50 can be formed from one or more precursor materials including high-impact polystyrene (HIPS), polybutadiene, polystyrene (PS), and acrylonitrile butadiene styrene (ABS) materials. In preferred embodiments, the precursor material(s) selected for use in the capping base 53 are thermoplastics, suitable for use in an extrusion process and the incorporation of one or more pigment additives 55, other colorants, tinting agents and the like. As also depicted in FIG. 2A, the capping base 53 of the capping region 50 can be configured with a thickness 52 (e.g., through extrusion, rolling, etc.) of about 0.013 mm (about 0.5 mils) to about 0.5 mm (about 20 mils). In a preferred embodiment, the capping base 53 has a thickness 52 of about 0.06 mm (about 2.5 mils) to about 0.19 mm (about 7.5 mils). Note that the thickness 52 of the capping base 53 of the capping region 50 is given in approximate dimensions, as would be typically associated with the capping base 53 being in a sheet or layer form before incorporation into the liner 100a. As noted earlier, the base region 10 and the capping region 50, as part of the liner 100a, do not contain any appreciable interfaces between them according to some implementations of the disclosure.

As also shown in FIG. 2A, the liner 100a includes one or more pigment additives 55, configured to impart color, tinting or the like into the liner 100a. As understood by those with ordinary skill in the field of the disclosure, various metallic, ceramic, polymeric pigments and colorants can be added at various concentrations within the polymeric materials employed in the liner 100a. For example, titanium oxide can be included as a pigment additive 55 to achieve a white color. As another example, a liner 100a with a charcoal-sparkle appearance can be created by employing carbon black and one or more of quartz, mica, and stainless steel as the pigment additives 55. In an aspect of the disclosure, the pigment additive(s) 55 are incorporated into the capping region 50 at a concentration level and dispersed to ensure that the liner 100a exhibits a particular color, hue or the like as desired by the user of the appliance or other end product employing the liner 100a. In a preferred embodiment, no additional additive(s) 55 are necessary in the base region 10 to obtain the desired color, hue or tinting for the liner 100a. According to another embodiment, additive(s) 55 are incorporated into the capping region 50 and the base region 10, e.g., as dispersed at concentrations sufficient for the liner 100a to obtain the desired color, hue or tinting. According to some aspects, the pigment additive(s) 55 are incorporated into the capping region 50 at a concentration from about 5% to about 30% (by weight). Optionally, the pigment additive(s) 55 are incorporated into the base region 10 at a concentration from about 1% to about 10%. Preferably, the concentration of the additive(s) 55 in the capping region 50 is set between about 15% to about 25% (by weight) and in the base region 10, if present, from 3% to about 5% (by weight).

Figure 2B:
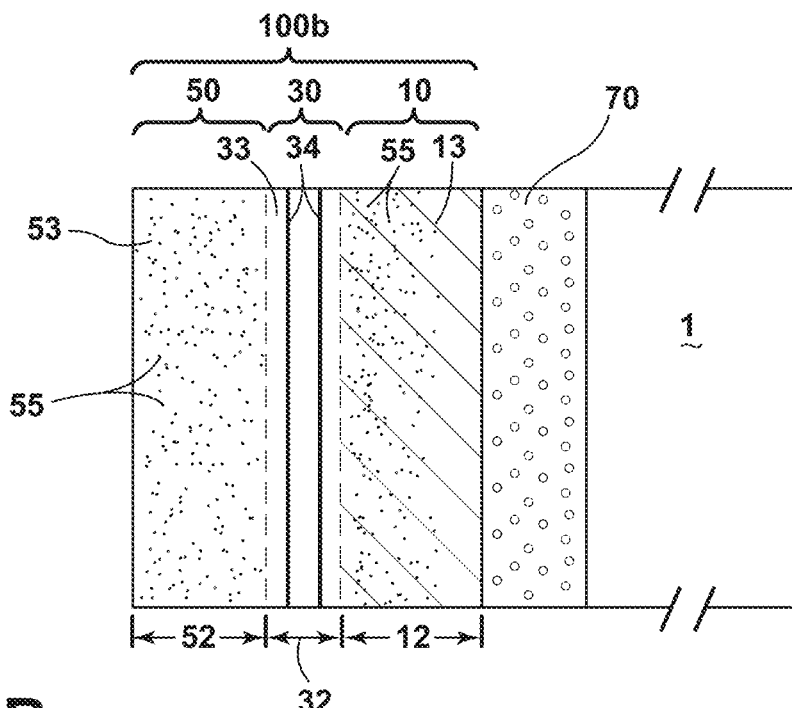
FIG. 2B is a schematic of an enlarged cross-section of a liner at region IIB comprising a capping region with a pigment additive, a barrier region and a base region according to an aspect of the disclosure.

As shown in FIG. 2B, a liner 100b (e.g., as incorporated into the appliance 200 depicted in FIG. 1) includes a capping region 50, a barrier region 30 and a base region 10. More generally, however, the liner 100b is similar in most respects to the liner 100a shown in FIG. 2A and described earlier. Accordingly, like-numbered elements and features of the liner 100b and the liner 100a have the same or similar structures and functions. The primary difference between the liner 100a and the liner 100b is that the latter includes a barrier region 30, sandwiched between the base region 10 and the capping region 50. In this implementation, the barrier region 30 offers protection to the capping region 50 from the diffusion of effluents, volatiles and other potential contaminants associated with the foam 70, installed adjacent to the cabinet 1. These contaminants, for example, could discolor or lead to other defects within the capping region 50.

According to an implementation of the liner 100b depicted in FIG. 2B, the capping region 50, the barrier region 30 and the base region 10 are joined with substantially no interfaces between them, thus forming a monolayer that serves as the liner 100b. More particularly, the liner 100b (or the monolayer of the liner) can include a base region 10 that is formed from a base 13 that comprises a high-impact polystyrene (HIPS) precursor material. The liner 100b also includes a capping region 50, disposed over a barrier region 30 and the base region 10, which is formed from a capping base 53 that comprises the same or a similar HIPS precursor material as employed in the capping region 50. The capping region 50 also includes a pigment additive 55 within the capping base 53. In general, the pigment additive 55 is incorporated and/or dispersed within the capping base 53 at a level sufficient to impart a desired color, hue, tinting or the like in the liner 100b.

Still further, the liner 100b depicted in FIG. 2B includes a barrier region 30 that is disposed between the base region 10 and the capping region 50. Preferably, the barrier region 30 comprises a polyethylene material and a material employed in the barrier base 33, typically a material comparable to that employed in the capping base 53 and/or the base 13, e.g., a high-impact polystyrene (HIPS). According to an embodiment, additional compatibilizers, as understood by those with ordinary skill in the art, are added to the barrier region 30 to ensure that the polyethylene layers and HIPS material within the barrier region 30 are combined without the formation of voids, bubbles, delamination defects, etc. In some implementations, the barrier region 30 includes one or more barrier layers 34 comprising a polyethylene material, as interspersed within the material of the barrier base 33.

According to an embodiment of the liner 100b, the barrier base 33 of the barrier region 30 can be formed from one or more precursor materials including high-impact polystyrene (HIPS), polystyrene (PS), styrenic polymers, acrylonitrile butadiene styrene (ABS), and combinations of these materials. In preferred embodiments, the precursor material(s) selected for use in the barrier base 33 are thermoplastics, suitable for use in an extrusion process. As also depicted in FIG. 2B, the barrier base 33 of the barrier region 30 can be configured with a thickness 32 (e.g., through extrusion, rolling, etc.) of about 0.13 mm (about 5 mils) to about 1.3 mm (about 50 mils). In a preferred embodiment, the barrier base 33 has a thickness 32 of about 0.25 mm (about 10 mils) to about 0.76 mm (about 30 mils). Note that the thickness 32 of the barrier base 33 of the barrier region 30 is given in approximate dimensions, as would be typically associated with the barrier base 33 being in a sheet or layer form before incorporation into the liner 100b. As noted earlier, the base region 10, barrier region 30 and the capping region 50, as part of the liner 100b, do not contain any appreciable interfaces between them according to some implementations of the disclosure.

Referring again to the liners 100a, 100b, a preferred implementation of these liners is configured such that the base region 10 and the capping region 50 (i.e., for liner 100a) or the base region 10, barrier region 30 and the capping region 50 (i.e., for liner 100b) are joined with substantially no interfaces between them. That is, a cross-section of the liner 100a, 100b when viewed under low magnification will not reveal any indications of an interface or interfaces between the base region 10, the barrier region 30 and/or the capping region 50. Advantageously, the lack of any appreciable interfaces between the capping region 50, barrier region 30 and/or the base region 10 significantly reduces the likelihood that these regions will delaminate during subsequent processing (e.g., thermo-forming of the liner 100a, 100b into a refrigeration appliance 200, such as depicted in FIG. 1) and other the demands of the application environment of the liner 100a. Another advantage of these liners is that the base region 10 and capping region 50 for the liner 100a, and the base region 10, barrier region 30 and the capping region 50 for the liner 100b, are configured with substantially no interfaces between them, thus eliminating the necessity of employing adhesives or other bonding agents to join them. As these implementations of the liners 100a, 100b do not require adhesives, they can be fabricated at a lower cost. Further, the lack of adhesives employed between these regions tends to result in improved color uniformity for these liners 100a, 100b in comparison to conventional, pigmented multi-layer liners with layers joined with internal adhesives.

Figure 3A:
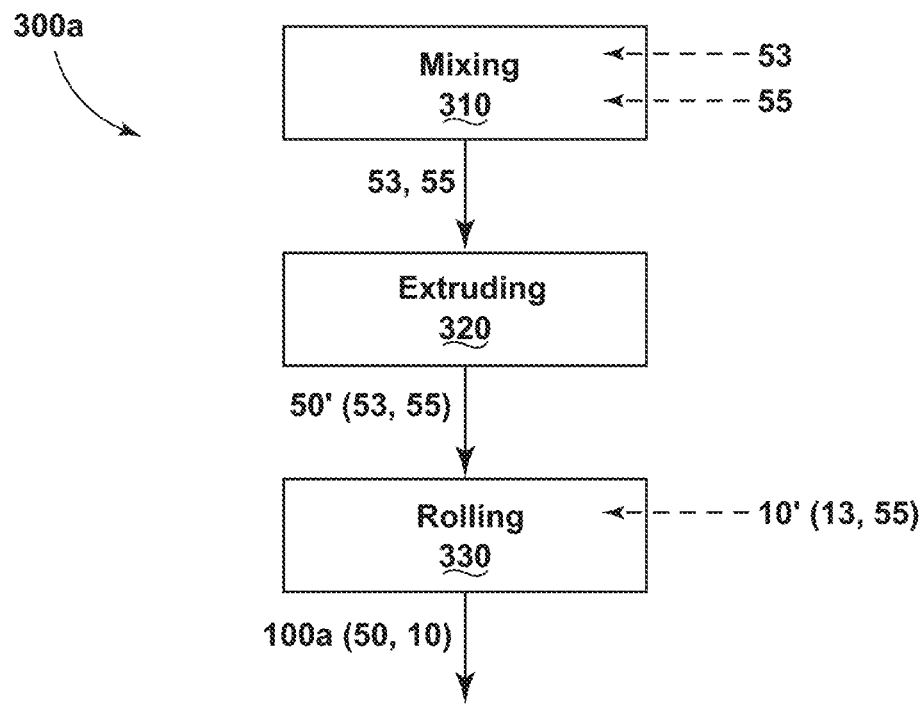
FIG. 3A is a flow chart schematic of a method of making a liner, such as depicted in FIG. 2A, according to a further aspect of the disclosure.

Referring now to FIG. 3A, a method 300a of making a liner, e.g., liner 100a, for an appliance is depicted in schematic form. The method 300a includes a mixing step 310 for mixing a polymeric capping layer precursor (e.g., for a capping base 53) and a pigment additive (e.g., pigment additive 55). In some embodiments, the mixing step 310 comprises mixing the polymeric capping layer precursor and from about 5% to about 30% pigment additive by weight, preferably from about 15% to about 25% by weight. The mixing step 310, for example, can be conducted within an extruder or in a separate vessel or container. According to some aspects, the mixing step 310 is conducted such that the polymeric capping layer precursor and pigment additive materials are mixed in particulate form.

Referring again to FIG. 3A, the method 300a of making a liner for an appliance further includes an extruding step 320 for forming the capping layer precursor (e.g., for a capping base 53) and the pigment additive (e.g., pigment additive 55) into a capping layer 50' at a capping layer formation temperature. According to some embodiments, the capping layer 50' that results from the extruding step 320 comprises pigment additives 55 that are substantially dispersed within a capping base 53, as derived from the capping layer precursor. In some implementations, the extruding step 320 is conducted in an extruder suitable for extrusion of thermoplastic materials into polymeric layers. According to some embodiments, the capping layer formation temperature is set between about 275° F. to about 400° F., preferably between about 290° F. and 370° F. In other aspects, the extruding step 320 is conducted with other apparatus to accomplish the same or similar function as would be understood by those with ordinary skill in the art, e.g., hot-pressing apparatus, injection molding apparatus, etc.

Referring once again to FIG. 3A, the method 300a of making a liner for an appliance further includes a rolling step 330 for rolling the capping layer (e.g., capping layer 50') into a polymeric base layer (e.g., polymeric base layer 10') to form a liner (e.g., liner 100a). In some aspects, the polymeric base layer, e.g., layer 10', includes a base 13 and, optionally, pigment additives 55 dispersed within the base 13. In addition, the rolling step 330 is conducted at about the capping layer formation temperature. According to an embodiment, the rolling step 330 of the method 300a is conducted by obtaining the capping layer, as it exists at the capping layer formation temperature during the preceding extruding step 320, and rolling it into the polymeric base layer. Accordingly, the rolling step 330 can involve rolling the capping layer and the polymeric base layer together, at about the capping layer formation temperature, to form a liner. By rolling the capping layer and the polymeric base layer together at about the same temperature in which they were extruded or otherwise processed in earlier steps, the rolling step 330 ensures that these features are joined together with substantially no interfaces between them. In some aspects, the liner can be characterized as a monolayer given that there are substantially no interfaces between the capping region and the base region within the liner. In some embodiments, the liner (e.g., liner 100a) that results from the rolling step 330 comprises a capping region (e.g., capping region 50) and a base region (e.g., base region 10), the capping region comprising the pigment additive. According to some aspects, the rolling step 330 is conducted to form a liner that comprises substantially no interfaces between the capping region and the base region.

In some implementations, the rolling step 330 is conducted with the capping layer and the polymeric base layer configured between a set of two or more rollers (not shown) that are set at a predetermined rolling pressure. Further, the rollers can be heated to about the capping layer formation temperature, e.g., between about 275° F. to about 400° F. That is, the capping layer comprising pigment additive, as formed in the preceding extruding step 320, is rolled during the rolling step 330 with a polymeric base layer through a set of rollers. The pressure applied by the rollers, and the fact that the rollers are set to approximately the capping layer formation temperature, ensures that that the capping layer and the polymeric base layer are merged together during the rolling step 330 into the liner.

According to an embodiment, the method 300a of making a liner depicted in FIG. 3A can be conducted with an additional shaping step (not shown) after formation of the liner in steps 310, 320 and 330. That is, the method 300a can be conducted with a step of shaping the liner into a final liner form at a shaping temperature, the final liner suitable for assembly into a refrigeration appliance (e.g., refrigeration appliance 200 as shown in FIG. 1). In some embodiments, the shaping step is conducted according to a thermo-forming process, typically at a temperature that approaches, but does not exceed, the capping layer formation temperature employed in earlier steps of the method 300a. In some aspects, the shaping step is conducted between about 200° F. to about 350° F.

According to some implementations of the method 300a of making a liner depicted in FIG. 3A, the mixing and extruding steps 310, 320 are conducted such that the capping layer that results from these steps exhibits a predetermined color. For example, a customer may select a predetermined color that is suitable for a liner to be made according to the method 300a. One can then engage in the mixing and extruding steps 310 and 320 of the method 300a to produce various trial capping layer samples, until a capping layer is produced that matches the predetermined color set by the customer. At this point, the method 300a can then be completed by rolling the desired capping layer with the rolling step 330 into a base layer to form a liner, the liner exhibiting the predetermined color by virtue of its incorporation of the capping layer with the predetermined color. Advantageously, the method 300a of making a liner can be conducted efficiently on a single extruder to develop various capping layers having desired colors. In contrast, some conventional approaches require the use of multiple extruders to produce a pigmented, multi-layer liner. Further, the incorporation of the pigment into the capping layer by the method 300a, without the need to disperse it through the full thickness of the liner, reduces pigment additive material costs.

Figure 3B:
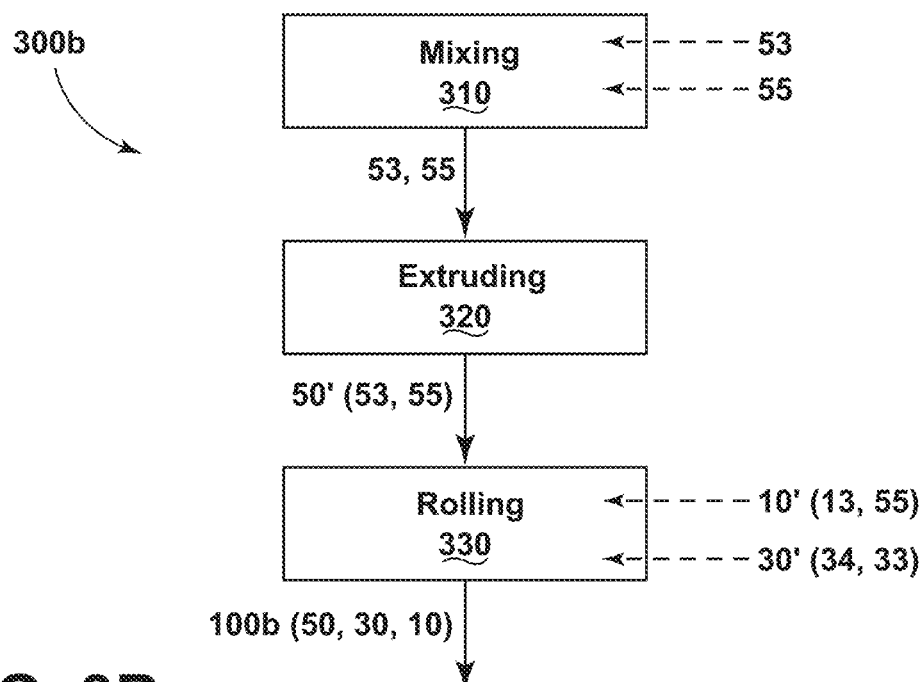
FIG. 3B is a flow chart schematic of a method of making a liner, such as depicted in FIG. 2B, according to a further aspect of the disclosure.

Referring now to FIG. 3B, a method 300b of making a liner, e.g., liner 100b, for an appliance is depicted in schematic form. The method 300b depicted in FIG. 3B is similar to the method 300a outlined earlier and depicted in FIG. 3A, and like numbered elements and steps have the same or similar features. The primary difference between method 300a and method 300b is that the rolling step 330 in the latter method further incorporates a barrier layer 30' into the capping layer 50' and the polymeric base layer 10'. That is, the rolling step 330 of the method 300b involves rolling the capping layer (e.g., capping layer 50'), a barrier layer 30' and a polymeric base layer (e.g., polymeric base layer 10') together to form a liner (e.g., liner 100b). In some aspects, the polymeric base layer, e.g., layer 10', includes a base 13 and, optionally, pigment additives 55 dispersed within the base 13.

In some aspects of the method 300b, the rolling step 330 of the method 300b is conducted at about the capping layer formation temperature. Accordingly, the rolling step 330 can involve rolling the capping layer, the barrier layer and the polymeric base layer together, at about the capping layer formation temperature, to form a liner (e.g., liner 100b). By rolling the capping layer, barrier layer and the polymeric base layer together at about the same temperature in which they were extruded or otherwise processed in earlier steps, the rolling step 330 ensures that these features are joined together with substantially no interfaces between them. According to an embodiment, the rolling step 330 of the method 300b is conducted by obtaining the capping layer, as it exists at the capping layer formation temperature during the preceding extruding step 320, and rolling it into the polymeric base layer and the barrier layer.

In some aspects of the method 300b, the liner (e.g., liner 100b) produced according to the method can be characterized as a monolayer given that there are substantially no interfaces between the capping region, barrier layer region and the base region within the liner. In some embodiments, the liner (e.g., liner 100*b*) that results from the rolling step 330 comprises a capping region (e.g., capping region 50), a barrier region (e.g., barrier region 30) and a base region (e.g., base region 10), the capping region comprising the pigment additive. According to some aspects, the rolling step 330 is conducted to form a liner that comprises substantially no interfaces between the capping region, barrier region and the base region.

Many variations and modifications may be made to the above-described embodiments of the disclosure without departing substantially from the spirit and various principles of the disclosure. For example, the principles associated with the methods of making a liner and the liner configurations of the disclosure can be employed in fabricating liners for use in various appliances, such as portable refrigerators, coolers, storage containers, etc. These methods and liner configurations can also be applied in the development of exterior surfaces of various appliances and other household items with various design aesthetics and coloration features. All such modifications and variations are intended to be included herein within the scope of this disclosure and protected by the following claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

What is claimed is:

1. A refrigeration appliance comprising:
   a pigmented liner comprising a capping region, a base region, and a composition,
   wherein, the capping region and the base region are contiguous without a layer interface separating the capping region from the base region;
      wherein, the composition of the pigmented liner at the capping region comprises a high-impact polystyrene and a pigment;
      wherein, the composition at the base region also comprises a high-impact polystyrene; and
      wherein, a weight percentage of the pigment in the composition at the capping region is greater than a weight percentage of the pigment in the composition at the base region.

2. The refrigeration appliance of claim 1 further comprising:
   a cabinet;
   wherein, the pigmented liner is mounted to the cabinet.

3. The refrigeration appliance of claim 2 further comprising:
   foam;
   wherein, the cabinet comprises a surface, and the foam is disposed on the surface of the cabinet and the pigmented liner is attached to the cabinet over the foam.

4. The refrigeration appliance of claim 1,
   wherein, the pigment comprises titanium oxide.

5. The refrigeration appliance of claim 1,
   wherein, the pigment comprises carbon black and one or more of quartz, mica, and stainless steel.

6. The refrigeration appliance of claim 1,
   wherein, the weight percentage of the pigment in the composition of the pigmented liner decreases from a maximum value of 30 percent by weight at the capping region to a minimum value of 1 percent by weight at the base region.

7. The refrigeration appliance of claim 1,
   wherein, the weight percentage of the pigment in the composition of the pigmented liner decreases from a minimum value of 15 percent by weight at the capping region to a minimum value of 3 percent by weight at the base region.

8. The refrigeration appliance of claim 1,
   wherein, the weight percentage of the pigment in the composition of the pigmented liner decreases from a maximum value of 25 percent by weight at the capping region to a minimum value of 3 percent by weight at the base region.

9. The refrigeration appliance of claim 1,
   wherein, the high-impact polystyrene of the composition of the pigmented liner at the base region is not present throughout the entirety of the composition of the pigmented liner at the capping region.

10. The refrigeration appliance of claim 9,
    wherein, the high-impact polystyrene of the composition at the capping region is not present throughout the entirety of the composition of the pigmented liner at the base region.

11. A refrigeration appliance comprising:
    a pigmented liner comprising a capping region, a base region, a barrier region between the capping region and the base region, and a composition;
    wherein, the capping region and the barrier region are contiguous without a layer interface separating the capping region from the barrier region;
    wherein, the barrier region and the base region are contiguous without a layer interface separating the barrier region from the base region;
       wherein, the composition of the pigmented liner at the capping region comprises a high-impact polystyrene and a pigment;
       wherein, the composition of the pigmented liner at the base region also comprises a high-impact polystyrene;
       wherein, the composition at the barrier region comprises polyethylene; and
    wherein, a weight percentage of the pigment in the composition of the pigmented liner at the capping region is greater than at the base region.

12. The refrigeration appliance of claim 11,
    wherein, the weight percentage of the pigment in the composition at the capping region is greater than at the barrier region.

13. The refrigeration appliance of claim 11,
    wherein, (i) the weight percentage of the pigment in the composition at the capping region is greater than at the barrier region; and (ii) the weight percentage of the pigment in the composition at the base region is greater than at the barrier region.

14. The refrigeration appliance of claim 11,
    wherein, the weight percentage of the pigment in the composition of the pigmented liner decreases from a maximum value of 30 percent by weight at the capping region to a value of 1 percent by weight or less within the base region, which 1 percent by weight or less is maintained through the base region.

15. The refrigeration appliance of claim 11,
wherein, the weight percentage of the pigment in the composition of the pigmented liner is at least 15 percent by weight at the capping region and decreases to a value of 0 percent by weight within the barrier region, and then increases from the value of 0 percent by weight within the barrier region to at least 3 percent by weight within the base region.

16. The refrigeration appliance of claim 11,
wherein, the weight percentage of the pigment in the composition of the pigmented liner decreases from a positive value at the capping region to a value of 0 percent by weight within the barrier region, and then increases from the base region to a positive value within the base region.

17. The refrigeration appliance of claim 11,
wherein, the barrier region comprises one or more layers of the polyethylene within a high-impact polystyrene.

18. The refrigeration appliance of claim 17,
wherein, the high-impact polystyrene at the barrier region is the same as the high-impact polystyrene at the capping region; and
wherein, the high-impact polystyrene at the barrier region is different than the high-impact polystyrene at the base region.

* * * * *